US007734781B2

(12) United States Patent
Fuller et al.

(10) Patent No.: US 7,734,781 B2
(45) Date of Patent: Jun. 8, 2010

(54) METHODS AND SYSTEMS FOR SHARED STORAGE VIRTUALIZATION

(75) Inventors: William Tracy Fuller, Cupertino, CA (US); David Powers, Morgan Hill, CA (US); Alan Nitteberg, Pleasanton, CA (US); Michael David Durham, Fremont, CA (US); Reece Joyner, San Mateo, CA (US); Barry Van Hooser, Pleasanton, CA (US); Lieu Thuy Thi Ta, San Jose, CA (US)

(73) Assignee: Savvis Communications Corporation, Town & Country, MO (US)

( * ) Notice: Subject to any disclaimer, the term of this patent is extended or adjusted under 35 U.S.C. 154(b) by 987 days.

(21) Appl. No.: 10/192,182

(22) Filed: Jul. 9, 2002

(65) Prior Publication Data

US 2003/0055972 A1 Mar. 20, 2003

Related U.S. Application Data

(60) Provisional application No. 60/303,346, filed on Jul. 9, 2001.

(51) Int. Cl.
*G06F 15/173* (2006.01)
(52) U.S. Cl. ...................................... 709/226; 709/225
(58) Field of Classification Search .......... 709/223–226
See application file for complete search history.

(56) References Cited

U.S. PATENT DOCUMENTS

| 5,325,505 A | 6/1994 | Hoffecker et al. |
| 5,371,852 A | 12/1994 | Attanasio et al. |
| 5,559,982 A | 9/1996 | Wideman |
| 5,719,854 A | 2/1998 | Choudhury et al. |
| 5,787,253 A | 7/1998 | McCreery et al. |

(Continued)

FOREIGN PATENT DOCUMENTS

EP 0 935 186 A 9/1999

(Continued)

OTHER PUBLICATIONS

Todd, B. "Block Oriented I/O Over IP," Apr. 19, 2001, pp. 1-5, Retrieved from the Internet: <URL: http://groups.google.com/groups?q=agg regation+switch+san&hl=en&lr=&ie=UTF-8 &oe=UTF-8&-selm=9bnm32%247fm%241%40pyrite.mv.net &rnum=2>.

(Continued)

*Primary Examiner*—Faruk Hamza
(74) *Attorney, Agent, or Firm*—Kenyon & Kenyon LLP

(57) ABSTRACT

In a shared storage infrastructure accessible by more than one customer, the shared storage infrastructure is separated into a plurality of logical storage areas. A customer is associated with at least one logical storage area within the shared storage infrastructure. The customer and its logical storage areas are associated with at least one port in the shared storage infrastructure. Each customer has access only to the logical storage areas associated with the customer and cannot access the logical storage areas of any other customer. The shared storage infrastructure provides policy based storage management to each customer, that is, each customer appears to have access to a non-shared storage subsystem. By providing a virtualization layer, a customer may be given the ability to manage its own storage needs.

13 Claims, 8 Drawing Sheets

U.S. PATENT DOCUMENTS

| | | | |
|---|---|---|---|
| 5,845,319 | A | 12/1998 | Yorimitsu |
| 6,061,724 | A | 5/2000 | Ries et al. |
| 6,078,990 | A * | 6/2000 | Frazier ..................... 711/114 |
| 6,115,797 | A * | 9/2000 | Kanda et al. ................ 711/147 |
| 6,260,120 | B1 | 7/2001 | Blumenau et al. |
| 6,295,575 | B1 | 9/2001 | Blumenau et al. |
| 6,321,263 | B1 | 11/2001 | Luzzi et al. |
| 6,338,101 | B1 | 1/2002 | Kakimi |
| 6,343,324 | B1 | 1/2002 | Hubis et al. |
| 6,356,985 | B1 * | 3/2002 | Ichimi et al. ................ 711/154 |
| 6,421,711 | B1 | 7/2002 | Blumenau et al. |
| 6,493,825 | B1 | 12/2002 | Blumenau et al. |
| 6,502,162 | B2 | 12/2002 | Blumenau et al. |
| 6,606,690 | B2 * | 8/2003 | Padovano .................... 711/148 |
| 6,640,278 | B1 * | 10/2003 | Nolan et al. .................... 711/6 |
| 6,697,846 | B1 * | 2/2004 | Soltis ......................... 709/217 |
| 6,742,034 | B1 * | 5/2004 | Schubert et al. ............. 709/226 |
| 6,748,502 | B2 * | 6/2004 | Watanabe et al. ........... 711/158 |
| 6,754,718 | B1 | 6/2004 | Dobberpuhl et al. |
| 6,792,459 | B2 | 9/2004 | Elnozahy et al. |
| 6,799,255 | B1 | 9/2004 | Blumenau et al. |
| 6,839,747 | B1 * | 1/2005 | Blumenau et al. ........... 709/223 |
| 6,845,395 | B1 * | 1/2005 | Blumenau et al. ........... 709/223 |
| 6,891,824 | B1 | 5/2005 | Gordon |
| 6,895,467 | B2 * | 5/2005 | Lubbers et al. ............. 711/114 |
| 6,898,634 | B2 * | 5/2005 | Collins et al. ............... 709/226 |
| 6,912,627 | B2 * | 6/2005 | Matsunami et al. ......... 711/154 |
| 6,922,685 | B2 | 7/2005 | Greene et al. |
| 6,957,294 | B1 * | 10/2005 | Saunders et al. ................ 711/4 |
| 6,966,033 | B1 * | 11/2005 | Gasser et al. ................ 715/738 |
| 7,010,493 | B2 | 3/2006 | Yamamoto et al. |
| 7,017,016 | B2 * | 3/2006 | Chujo et al. ................. 711/147 |
| 7,107,534 | B1 * | 9/2006 | de Jong et al. .............. 715/734 |
| 7,464,163 | B1 | 12/2008 | Bantz et al. |
| 7,493,382 | B2 * | 2/2009 | Kudo et al. ................. 709/223 |
| 7,502,898 | B2 * | 3/2009 | Blumenau et al. ........... 711/152 |
| 2001/0039582 | A1 | 11/2001 | McKinnon et al. |
| 2002/0007417 | A1 | 1/2002 | Taylor et al. |
| 2002/0007445 | A1 | 1/2002 | Blumenau et al. |
| 2002/0027894 | A1 | 3/2002 | Arrakoski et al. |
| 2002/0104008 | A1 | 8/2002 | Cochran et al. |
| 2002/0107908 | A1 | 8/2002 | Dharanikota |
| 2002/0116479 | A1 | 8/2002 | Ishida et al. |
| 2002/0129246 | A1 | 9/2002 | Blumenau et al. |
| 2002/0138691 | A1 | 9/2002 | Yamamoto et al. |
| 2002/0174227 | A1 | 11/2002 | Hartsell et al. |
| 2002/0194294 | A1 | 12/2002 | Blumenau et al. |
| 2003/0009444 | A1 | 1/2003 | Eilder et al. |
| 2003/0167180 | A1 | 9/2003 | Chung et al. |
| 2003/0198235 | A1 | 10/2003 | Weldon et al. |
| 2003/0217129 | A1 | 11/2003 | Knittel et al. |
| 2003/0217140 | A1 | 11/2003 | Burbeck et al. |
| 2003/0236745 | A1 | 12/2003 | Hartsell et al. |
| 2004/0044753 | A1 | 3/2004 | Toyoshima et al. |

FOREIGN PATENT DOCUMENTS

| | | |
|---|---|---|
| WO | WO 00 55735 A | 9/2000 |
| WO | WO 00/55750 A1 | 9/2000 |
| WO | WO 01/20470 A1 | 3/2001 |
| WO | WO 01 61680 A | 9/2001 |
| WO | WO 03/005209 | 1/2003 |
| WO | WO 03/007154 | 1/2003 |

OTHER PUBLICATIONS

Newcomb, Kevin, "Portera Chooses BMC for SLA Monitoring," Jan. 29, 2001, from www.itnewsplanet.com/xSP/article.php/573011.

Office Action from European Patent Office for Application No. 02782505.8-2212 mailed Aug. 20, 2004.

Office Action from European Patent Office for Application No. 02782505.8-2212 mailed Dec. 15, 2005.

\* cited by examiner

METHODS AND SYSTEMS FOR SHARED STORAGE VIRTUALIZATION

RELATED APPLICATIONS

This application claims the benefit of priority of provisional application 60/303,346, filed Jul. 9, 2001, which is hereby expressly incorporated herein by reference.

TECHNICAL FIELD

This invention relates generally to data storage systems and, more particularly, to methods and systems for providing virtualization of shared secure storage to customers.

BACKGROUND

In today's business world, a company's data is often one of its most important company assets. With today's voluminous amounts of important data come the problems associated with storing the data and managing access to the data. In the beginning, computer systems had only as much storage as was available on the disk drive of the individual computer system. As the company's data grew, companies had to constantly purchase larger and more expensive memory disk space to keep pace with its increasing data storage requirements. In this very basic scenario, data storage was as secure as the physical location of the computer system, that is, only those individuals with physical access to the device or with permission to use the connected computer system could have access to the data. This process, however, was not cost efficient, as each individual computer system frequently had unused storage capacity.

Over the years, storage of data on external disk devices became common and other models for data storage emerged. In a host-centric legacy environment, one or more centralized data storage devices would be connected to a host computer and managed by the IT department. This system allowed for better management of storage space and the IT department was able to control the security of the storage space.

The advent of client/server and network computing has allowed for more complex, but economical data sharing configurations, but often at the expense of data security. For example, most companies operate a local area network (LAN) with client computers, application servers, and a combination of storage devices. Most conventional LANs do not have storage devices directly connected to the LAN, but rather use storage accessible through a server that is connected to the LAN. Individual users operate client computers (also called "network" computers, if connected to a network) for data entry and presentation. The users run applications on application servers and access data stored on various storage devices, which may be directly connected to the client or network computer or accessible over a network. Today's storage systems even allow data to be shared over a wide area network such as the Internet. In the typical LAN, however, data storage is decentralized and therefore hard to manage and control. Companies rarely know exactly how much storage they have or where valuable data may be located. Companies that do not accurately plan for future storage needs may find themselves suddenly needing extra capacity that they do not have or with excess capacity that is wasted while sitting idle. Additionally, decentralized storage suffers the additional drawback in that application-processing speed is often adversely affected because the server is spending precious processor cycles monitoring data movement between storage spaces. Furthermore, decentralized data storage is also difficult to secure properly as anyone with access to the network may be able to access the data.

One fairly recent improvement in data storage management has been the introduction of the Storage Area Network (SAN). A SAN is a centrally managed network of multi-vendor storage devices interconnected by routers, bridges, switches, and gateways, which is managed using storage management software. SANs may be dedicated to one server, but more commonly are shared between multiple servers. SANs are constructed from storage interfaces and therefore support direct, high-speed data transfers between servers and storage devices.

However, even SANs fail to solve all the problems of storage management. For example, companies must still plan for future storage needs and purchase costly storage devices on a regular basis to handle the company's growing storage needs. Additionally, if a company downsizes, it is frequently left holding costly unused data storage devices. Consequently, many companies are outsourcing their data storage and management functions to a Storage Service Provider (SSP). Conventional SSP arrangements are flexible and allow a business to pay only for the storage it uses or reserves within a particular time frame. Therefore, if a company has a sudden need for new or additional storage, it can obtain the additional storage quickly and easily without the need to wait for additional hardware to be installed.

One of the problems with the current SSP model is that a company must trust another organization to maintain the availability and security of its information assets. Current SSPs use a one-to-one service provisioning model. This means that for each customer, the SSP maintains at least one dedicated storage device. This system provides some assurance to the customer that other customers will not be able to access the customer's confidential information. This system, however, is largely inflexible and more costly to operate for SSPs because the SSP must purchase and support separate equipment for each customer, even though a larger percentage of the storage device is not currently being used by the customer. Therefore, there is a need for a system and method for allowing SSPs to securely share storage resources between multiple customers without compromising the security of any customer's data.

Furthermore, in today's IT enterprise environment the actual storage subsystem (drive, or logical volume) is typically "visible" to a particular server or host computer. In addition, the host typically has administrative type privileges and can perform actions like enabling snapshots, creating and formatting logical volumes, or, even, deleting volumes and/or data. This is true even with the advent of storage area networks, or "SANs". While SANs can make more storage accessible to multiple servers, the servers still mount actual storage devices (or at least the logical view presented by local storage controller) and a single homogenous customer enterprise has administrative control over the subsystem. Knowledge of the underlying storage implies that scalability is limited by the size of the attached storage subsystem; migration of data from one storage technology to another implies data must pass through the common host; and the ability to share a common storage amongst hosts is difficult or undesirable. These issues are accentuated in an environment wherein the servers are from different enterprise environments (such as, for example, a Storage Service Provider application) or are competitors.

In this heterogeneous customer environment, the ability for any customer to mount and manage a shared storage subsystem is neither desirable nor secure. Currently, virtualization, or abstraction, functions are handled by software layers in a host (such as, for example, volume managers) or separate, inline virtualization boxes (by, for example, smart fiber channel switches). The primary function of these subsystems/software is to present abstracted Local Unit Numbers ("LUNs") to a client machine on a SAN. They then provide the logical to physical addresses translation for the data access operations. The software abstraction layers within host environments do not allow sharing of storage between customers (as you would have conflicting virtualization control over common storage). The separate virtualization subsystems do not provide the shared management capabilities (that is, support for multiple, heterogeneous customers managing their data and it's movement), do not provide for heterogeneity amongst virtualization engines, do not provide for metropolitan area network ("MAN")/wide area network ("WAN") data replication services, nor the scalability required to manage geographically separate storage subsystems. Therefore, there is a further need to provide methods and systems for keeping track of and managing data and data access by and on behalf of multiple customers across a common storage infrastructure.

SUMMARY OF THE INVENTION

Systems and methods consistent with the present invention overcome the shortcomings of conventional systems by allowing secured sharing of storage resources between multiple customers without compromising the security of any customer's data.

An embodiment consistent with the present invention relates to a shared storage architecture comprising a plurality of logical storage areas, the storage architecture shared by a plurality of customers. In a method consistent with the present invention a request is received from one of the plurality of customers and it is determined which of the plurality of logical storage areas are not assigned to any of the plurality of customer. The unassigned logical storage areas is displayed to the customer and at least one of the unassigned logical storage areas is assigned to the one customer. Assignment may comprise assigning the customer-selected logical storage area to the customer.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention. The objects and advantages of the invention will be realized and attained by means of the elements and combinations particularly pointed out in the appended claims.

Exemplary systems and methods consistent with the present invention are recited in the attached claims. It is to be understood that both the foregoing general description and the following detailed description are exemplary and explanatory only and are not restrictive of the invention, as claimed.

DESCRIPTION OF THE DRAWINGS

The accompanying drawings, which are incorporated in, and constitute a part of the specification, illustrate implementations of the invention and, together with the detailed description, serve to explain the principles of the invention. In the drawings.

DETAILED DESCRIPTION

Reference will now be made in detail to implementations of the invention, examples of which are illustrated in the accompanying drawings. Wherever possible, the same reference numbers will be used throughout the drawings to refer to the same or like parts.

In accordance with an embodiment of the present invention, methods and systems are provided for sharing data storage between at least two customers. This system provides the ability to share individual tape or disk storage subsystems, such as EMC Symmetrix, Hitachi 7700, ADIC Scalar 1000; storage interconnects such as Brocade FC switches and Cisco iSCSI; and other common infrastructure among multiple, individual enterprises.

Figure 1:
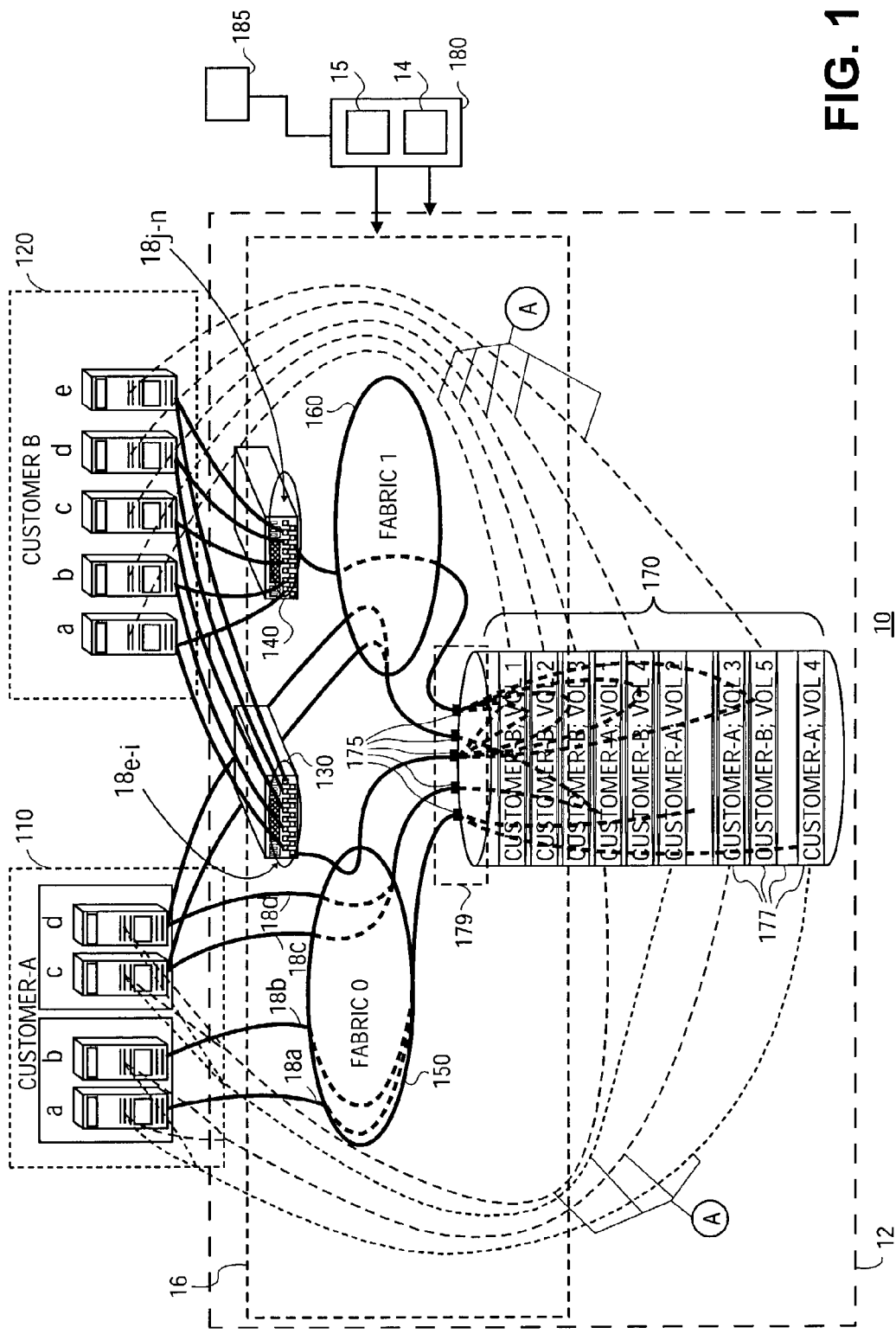
FIG. 1 is a block diagram illustrating general system architecture in accordance with methods and systems consistent with the present invention.

FIG. 1 is a block diagram illustrating general system architecture of a shared storage area network (SAN) 10 in accordance with methods and systems consistent with the present invention. SAN 10 is operated under control of a data storage provider to provide data storage and management services for a plurality of customers, such as customers 110 and 120.

SAN 10, which provides heterogeneous storage and data consolidation across different hardware and operating systems platforms, comprises a data storage infrastructure 12 and a management server 180. Data storage infrastructure 12 comprises a data storage device 170, a configuration mechanism 16, and a plurality of customer ports 18a-18n. Data storage device 170 may be, for example, a disk storage system such as an EMC Symmetrix or a Hitachi 7700. Data storage device 170 comprises a plurality of device input ports 175, a data storage area configurable into a plurality of logical storage areas 177 under control of a device configuration mechanism 179. Device configuration mechanism 179 is operable to associate logical storage areas 177 with specific device input ports 175. Although data storage infrastructure 12 is shown in FIG. 1 as including only a single data storage device 170, certain embodiments of the present invention may include multiple such disk storage devices, as well as other types of storage systems, such as an ADIC Scalar 1000 tape system.

Management server 180 comprises, for example, management processor 14 and RAM 15.

As shown in FIG. 1, configuration mechanism 16 comprises device configuration mechanism 179 and further comprises aggregation switches 130 and 140 and fabrics 150 and 160. As is well known to the skilled in the art, "fabric" generally refers to the hardware that connects workstations and servers to storage devices in a SAN, and may comprise hubs, bridges, routers, switches, and gateways. Fabrics suitable for use with the present invention may, for example, use fibre channel, Ethernet, InfiniBand, or similar technologies. One example of a fibre channel fabric consistent with the present invention is the Fibre Channel Arbitrated Loop (FC-AL).

Configuration mechanism 16 is coupled to management server 180, including management processor 14. Through management server 180, the data storage provider may cause configuration mechanism 16 to associate customer ports 18a-18n with specified logical storage areas 177, cause data received from customers 110 and 120 to be stored in corresponding specified logical storage areas 177, and limit access to the logical storage areas 177 to only the corresponding customers.

Customers 110 and 120 may embody any number of customer devices, such as individual personal computers or workstations a, b, c, d, and e configured in a client/server architecture. SAN 10 provides interoperability between various devices and components such that customers 110 and 120 may configure their respective networks using different platforms such as Unix or Windows NT, respectively.

Switches 130 and 140 may interconnect a large number of customer devices to SAN 10 for increased scalability. Each customer device gains access to SAN 10 by connecting to a designated port of at least one of switch 130 and 140 or fabric 150 and 160. As shown in FIG. 1, each device a-e of customer 120 may connect to a customer port of both switch 130 and 140. Switches 130 and 140 each provide a single output for connecting to fabrics 150 and 160, respectively.

Storage device 170 comprises a large volume of available storage space. Device ports 175 facilitate the transfer of data into and out of storage device 170. Device configuration mechanism 179 partitions the large storage space of storage device 170 into a plurality of logical storage areas, or (LUNs) 177. Device configuration mechanism 179, under control of management server 180, assigns at least one LUN 177 to each server of customers 110 and 120 (shown by the dashed lines A), and when customers 110 and 120 request access to storage device 170, device configuration mechanism 179 executes authentication and authorization processes before access is granted.

Fabrics 150 and 160 are subnetworks of SAN 10. Fabrics 150 and 160 each may include a bi-directional data channel that facilitates data communication between servers of customers 110 and 120 and storage device 170. Fabric 150, for example, comprises enabled nodes 18a-18d, which share the total available bandwidth of the bi-directional channel. Because the bandwidth is shared, each connected customer server must execute an arbitration process to gain access to the channel for data transfer. Fabrics 150 and 160 may contain a plurality of network devices (not shown) that ensure connectivity among each node on the their respective fabric. For example, a hub (not shown) may manage node-to-node connectivity by opening a loop when a node is enabled and closing the loop when a node is disabled.

Management server 180 monitors the assets, capacity, configuration, performance, and operability of SAN 10. Management server 180 operates configuration mechanism 16 such that each customer server is assigned to an available customer port. As shown in FIG. 1, for example, management server 180 maps connectivity between servers of customer 120 and corresponding customer ports of switches 130 and 140. Management server 180 also operates configuration mechanism 16 to map servers of customer 110 to corresponding customer ports on fabrics 150 and 160. Even further, management server 180 operates configuration mechanism 16 to map output ports 19 of fabric 150 to corresponding device ports 175 of storage device 170. Still further, management server 180 maps output ports 20 of fabric 160 to corresponding ports 175 of storage device 170.

Management server 180 collects data used to monitor various aspects of SAN 10 to ensure that configuration mechanism 16 enables secure and efficient transfer of data. Management server 180 analyzes the collected data, as discussed in detail below, and provides an interactive interface to the data storage provider so that maintenance can be performed where needed.

Fibre channel technology enables SAN 10 to combine the high performance of an input/output (I/O) channel with the advantages of a network using similar network technology components like routers, switches, bridges, and gateways. To effectively manage the interoperability of all connected components and provide a secure storage environment, management server 180 monitors components and system events associated with a particular customer based on specific service level agreements indicated by that customer. Prior to connecting to SAN 10, customers 110 and 120, for example, provide to the data storage provider service expectancies and system policies outlined in a service level agreement (SLA). The SLA identifies attributes such as system performance, system availability, and storage capacity desired for data transfer. The data storage provider stores the desired service attributes of each customer in a memory 15 of management server 180, in such a manner that the associated customer is identified. Based on the SLAs for each customer, management server 180 may configure SAN 10 so that the attributes of each customer's SLA can realized. The configuration of SAN 10 is a result of the operational control implemented by management server 180.

Management server 180 may further incorporate a business management architecture that associates specific pieces of the shared technology infrastructure to a particular customer based on usage. When customer 110 transfers data, for example, SAN 10 collects information related to operation, performance, or health of the network architecture. Management server 180 analyzes the collected information and determines whether the terms of the SLA associated with customer 110 are being met, based on a comparison of the collected information of customer 110 with the SLA data of customer 110 stored in memory. Next, management server 180 provides the results of the determination to an interface 185 for access by the data storage provider. If, for example, management server 180 determines that all terms of the SLA for customer 110 are met, the interface may display an icon associated with customer 110 in its original hue. If, however, management server 180 determines that an aspect of the SLA for customer 110 is not met, a small number of aspects of the SLA for customer 110 are not being met, or a gross violation of the SLA for customer 110 exists, the interface may display an icon associated with customer 110 in a green, yellow, or red hue, respectively.

Figure 2:
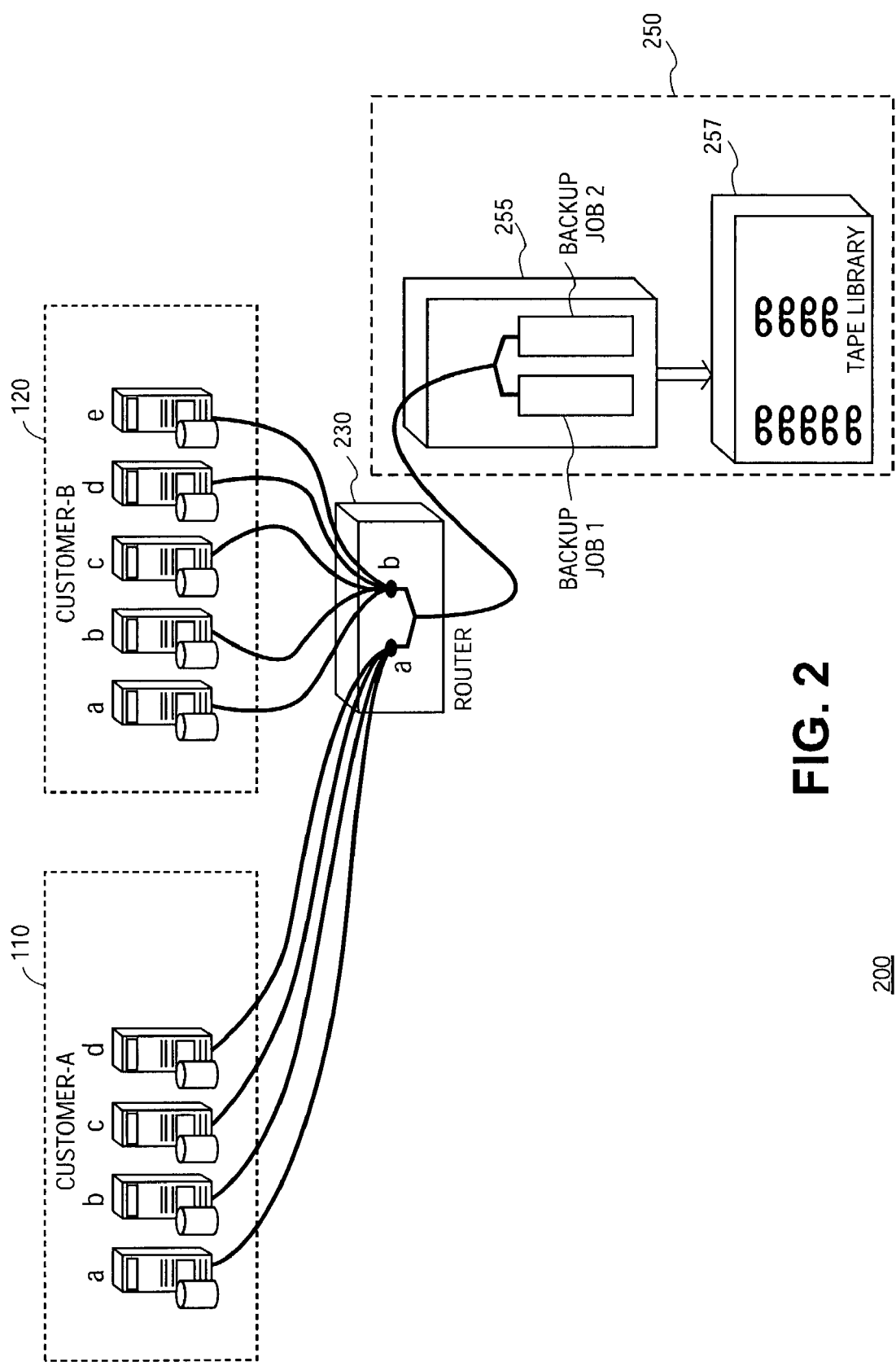
FIG. 2 is a block diagram illustrating a storage area network implementing a shared security model in accordance with methods and systems consistent with the present invention.

FIG. 2 is a block diagram illustrating a storage area network 200 implementing a backup storage configuration in accordance with methods and systems consistent with the present invention. In this example, SAN 200 comprises customers 110 and 120, a router 230, and backup server 250, which may all be interconnected using standard TCP/IP protocol.

Router 230 provides a standard LAN interface, such as Ethernet, and facilitates the transfer of data into and out of backup server 250. In adding a second layer of security, on router 230, the administrator may further install packet filters, such as access control lists, so that the data transferred by customer 110, for example, cannot be compromised by customer 120. The implementation of a virtual local area network ("VLAN") in conjunction with the packet filter configuration provides each of customers 110 and 120 with a unique connection to backup server 250.

Backup server 250 comprises port controller 255 and tape library 257, which are operatively connected by any available means such as, for example, SCSI connectors. Port controller 255 manages the transfer of data to and from tape library 257. Tape library 257 comprises a plurality of tapes, which store information associated with customers 110 and 120. To further ensure that no customer data is compromised, an administrator assigns a set of physical tapes within the tape library to each of customers 110 and 120.

Port controller 255 assigns each device to an available port connection on the network. Based on the SLA provided each of customers 110 and 120, port controller 255 configures network connections so that secure and efficient data transfers may be realized. In FIG. 2, for example, port controller maps customer servers 110$a$-$d$ and 120$a$-$e$ to a corresponding ports 230$a$ and 230$b$, respectively, of router 230. In this manner, port controller 255 assigns customer 110 and 120 to a VLAN connection.

Port controller 255 further provides packet filters or access control lists to router 230 so that customer 110, for example, would not be capable of accessing the devices of customer 120. In implementing a VLAN and packet filtering, port controller 255 ensures that each of customer's 110 and 120 employ an exclusive connection to backup server 250.

Port controller 255 manages data security for customers 110 and 120 on backup server 250 as well. Port controller 255 assigns customers 110 and 120 to exclusive classes for all executed backup jobs. These exclusive classes ensure that data related to a backup operation of customer 110 does not become corrupted with data from backup operation of customer 120. Customers 110 and 120 may initiate a backup or restore operation by issuing a request to backup server 250. For each backup or restore operation, port controller 255 may perform authentication and authorization processes before access to tape library 257 is granted. Port controller 255 enables an associated port of a customer during a data transfer and disables the associated port once data transfer has completed. In this manner, port controller closes possible holes in the network that may be used by unauthorized clients to access customer data.

Figure 3:
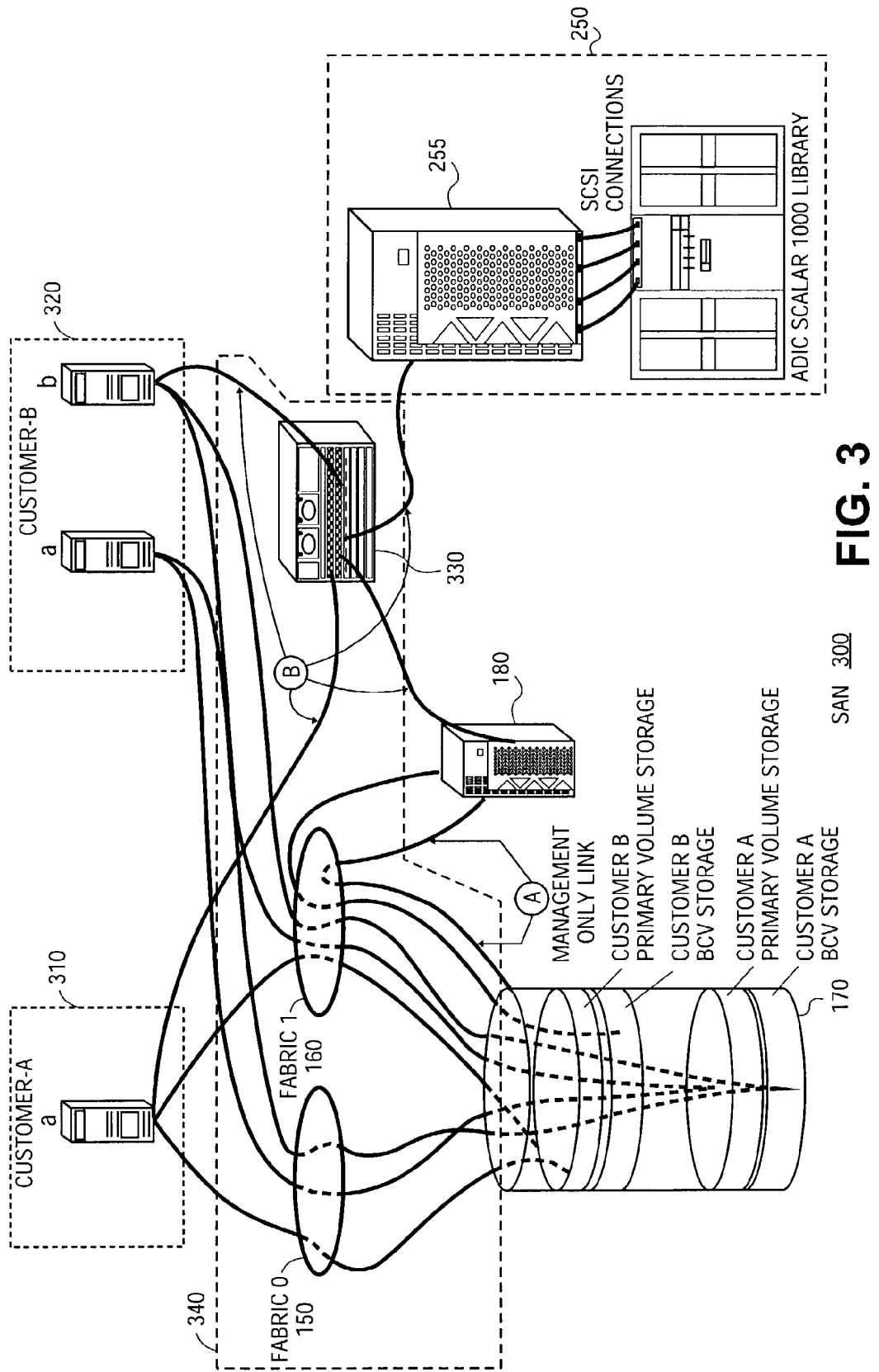
FIG. 3 is a block diagram illustrating storage area network architecture enabling multiple customers to manage a shared resource consistent with methods and systems of the present invention.

FIG. 3 is a block diagram illustrating storage area network architecture enabling multiple customers to manage a shared resource consistent with methods and systems of the present invention. In FIG. 3, SAN 300 provides a secure storage area network while also allowing a customer to manage certain aspects of their respective data. SAN 300 comprises customers 310 and 320, fabrics 150 and 160, a switch 330, storage device 170, management server 180, and a backup server 250.

Customers 310 and 320 may embody any number of individual personal computers or workstations configured in a client/server architecture. Moreover, customers 310 and 320 may implement their respective networks using different platforms such as Unix or Windows NT, respectively.

Switch 350 facilitates a connection between server 310$a$ of customer 310, server 320$b$ of customer 320, management server 180, and backup server 250 (designated by "B" in FIG. 3). Switch 330 enables data transfer and communication protocol between any two devices connected to any of its ports. Particularly, switch 330 provides server 310$a$ and server 320$b$ each with a secure link to the management server.

Management server 180, similar to the system shown in FIG. 1, controls a configuration mechanism 340 of SAN 300 so that secure and efficient data transfers occur. In certain embodiments, management server 180 further performs processes that store backup data to backup server 250.

When customer 310, for example, desires to initiate a backup operation, server 310$a$ issues a backup request to management server 180. Management server 180, through a management-only link (designated by "A" in FIG. 3) connected via fabric 160 to a port of storage device 170, commands a configuration mechanism of storage device 170 to send the identified data to customer 310. Management server 180 then issues a backup request to backup server 250. Port controller 255 secures a link with customer 310 via switch 330, so that when server 310$a$ receives data from storage device 170, the data may be transferred to backup server 250.

When management server 180 detects a backup request, management server 180 executes a data backup process. In this process, management server 180 authenticates the customer 110 by, for example, matching assigned network attributes to the customer or any other suitable authentication process. Next, management server 180 authorizes data backup and issues the necessary management commands to the appropriate devices so that the data backup is successfully accomplished. The operations performed by management server 180 may not require any further input by customer 310, outside of the initial backup request.

Customer 320, however, may desire to perform data backup using direct communication with backup server 250. In this instance, the backup operation is executed in a manner similar to the process described in relation to FIG. 2.

To ensure secure data transfers, management server 180 may use at least one of a number of different approaches. In one approach, to ensure that no outside client machines (not shown) can discover or route to a network operations center of the data storage provider, management server 180 may implement packet filters, such as access control lists, so that only clients and servers, which reside at the network operations center, are authorized to connect to identified points of deployment (POD). PODs are storage area network components that are located at a customer's access-controlled facility. A POD located at an access-controlled facility of customer 310, for example, may include a router 230, storage device 170, management server 180, and backup server 250.

In certain embodiments, data security is provided over an Internet connection. In this instance, management server 180 may control a firewall to encrypt or decrypt some or all data traffic between a network operation center and a POD. Furthermore, in providing a secure storage area network, the data storage provider may configure one or more Internet protocol (IP) addresses so that no data can be communicated between PODs.

In yet another certain embodiment for providing a secure storage area network consistent with the present invention, management server 180 may control access to all manageable objects within a POD via password protection so that only authorized clients are capable of accessing management functions. The security options discussed above are by no means an exhaustive list of possible configurations. Implementations of any network security measures are dependent on network configuration, network resources, and cost of implementation.

Figure 4:
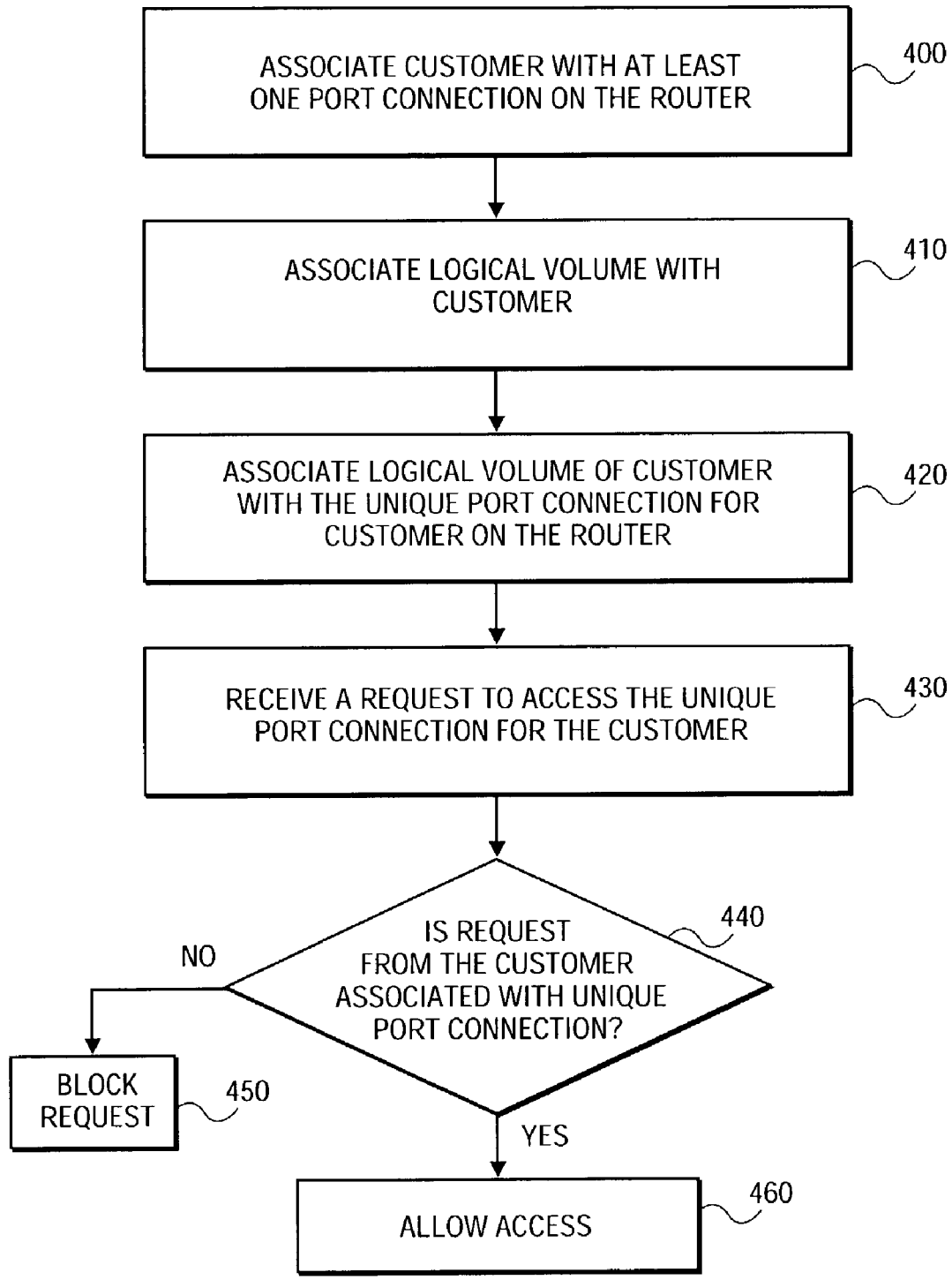
FIG. 4 is a flowchart illustrating a process for securing a shared storage area in accordance with methods and systems consistent with the present invention.

FIG. 4 is a flowchart illustrating a process for securing a shared storage area in accordance with methods and systems consistent with the present invention the present invention. It should be apparent that the series of steps described below might be performed by any of the shared storage area architectures set forth in FIGS. 1-3 and 6. For illustrative purposes, however, the following steps correspond to the storage architecture provided in FIG. 3. At step 400, based on the policies provided by customer 310 or established heuristically by the network, an administrator associates customer 310 with at least one unique port connection of router 350.

At step 410, storage area 360 is partitioned into a plurality of smaller storage areas or logical volume units and at least one of the logical volume units is associated with customer 310. At step 420, the logical volume associated with customer 310 is associated with the at least one unique port connection associated with customer 310 in step 400. At step 430, router 350 receives a request to access the unique port connection for customer 310 from customer 310. The request comprises attributes associated with a specific technology associated with customer 310. At step 440, router 350 determines if the request was received from customer 310 by, for example, matching at least one attribute provided in the request to an attribute stored in memory (not shown). If the request is not authenticated as coming from customer 310, the request to access is blocked (step 450). If the request is authenticated as coming from customer 310, router 350 allows access to the unique port connection on storage device 360.

Figure 5:
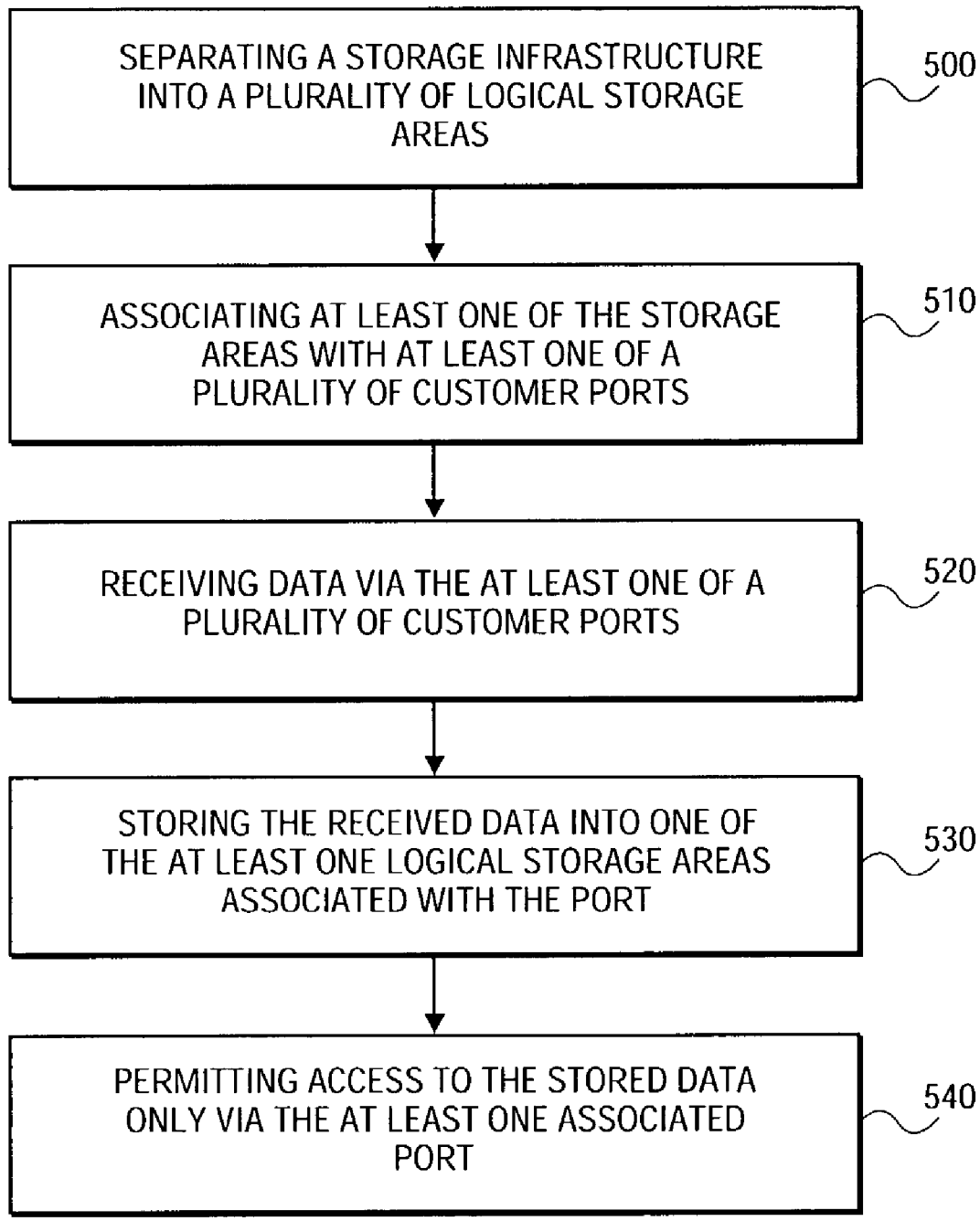
FIG. 5 is a flowchart illustrating a method for storing data of a plurality of users on a shared storage network in accordance with the present invention.

FIG. 5 is a flowchart illustrating a process for storing data of a plurality of users on a shared storage network in accordance with methods and systems consistent with the present invention. At step 500, a management processor separates a data storage infrastructure into a plurality of logical storage areas. Next, at step 510, one or more of the logical storage areas is associated with at least one of a plurality of customer ports. At step 520, data is received from one of the customer ports. At step 530, the received data is stored into at least one logical storage area corresponding to the customer port. Finally, at step 540, access is permitted to the stored data only via the customer port corresponding to the at least one logical storage area.

Figure 6:
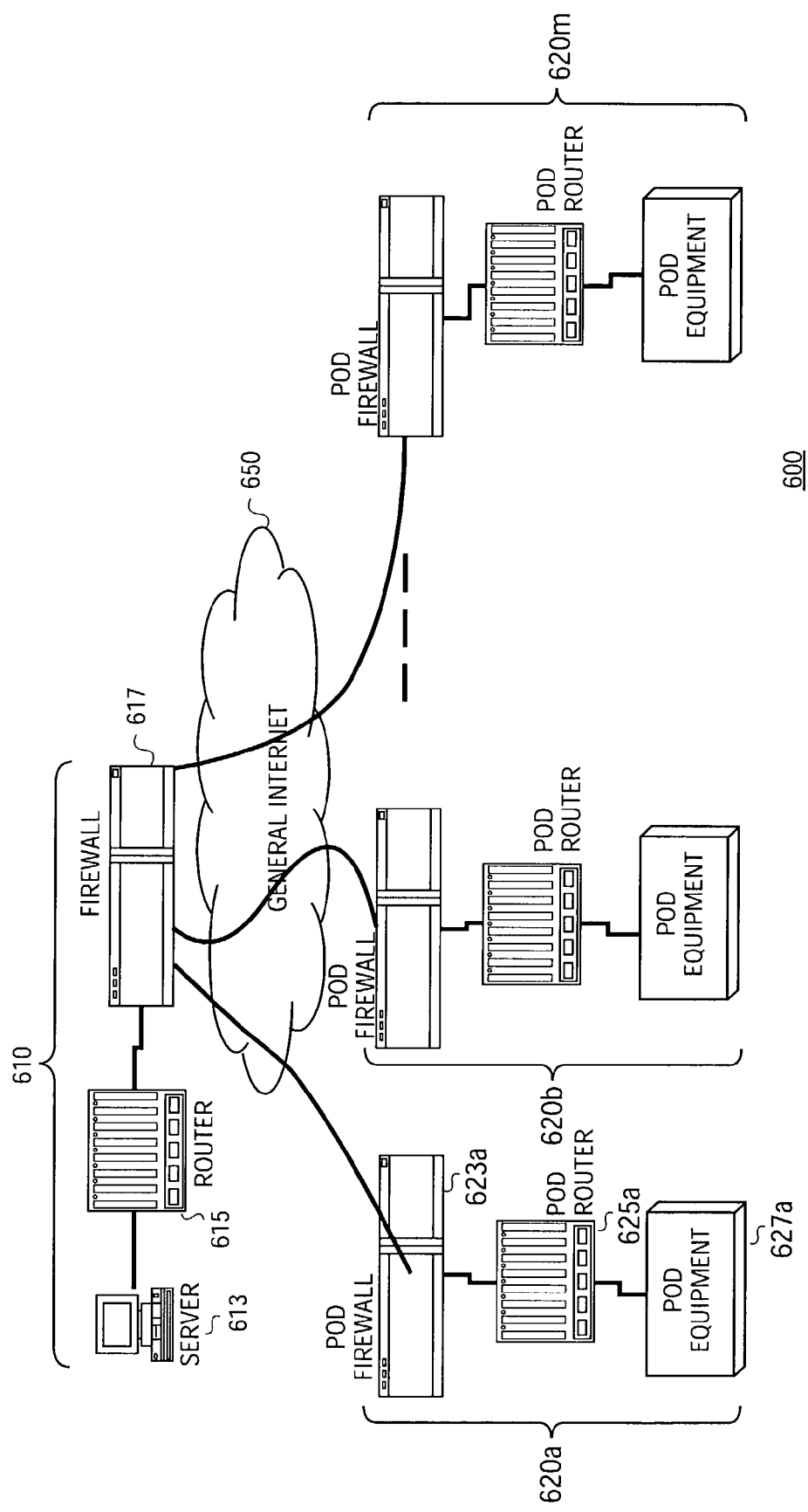
FIG. 6 is a block diagram illustrating a storage area network architecture implemented over an Internet connection in accordance with methods and systems consistent with the present invention.

FIG. 6 is a block diagram illustrating a storage area network architecture implemented over an Internet connection in accordance with methods and systems of the present invention. SAN 600 comprises network operations center (NOC) 610 and POD networks 620a-620n. NOC 610 comprises a server 613, a router 615, and a firewall 617. POD network 620a, for example, comprises firewall 623a, router 625a, and POD equipment 627a. POD equipment 627a may embody any type of storage subsystems such as a disk or tape libraries. POD firewall 623a ensures that POD equipment 627a is securely contained within a particular enterprise. Moreover, in certain embodiments, POD firewall 623a functions so that POD equipment 627a is invisible to any devices connected to Internet 650 that reside outside of POD network 620a.

Figure 7:
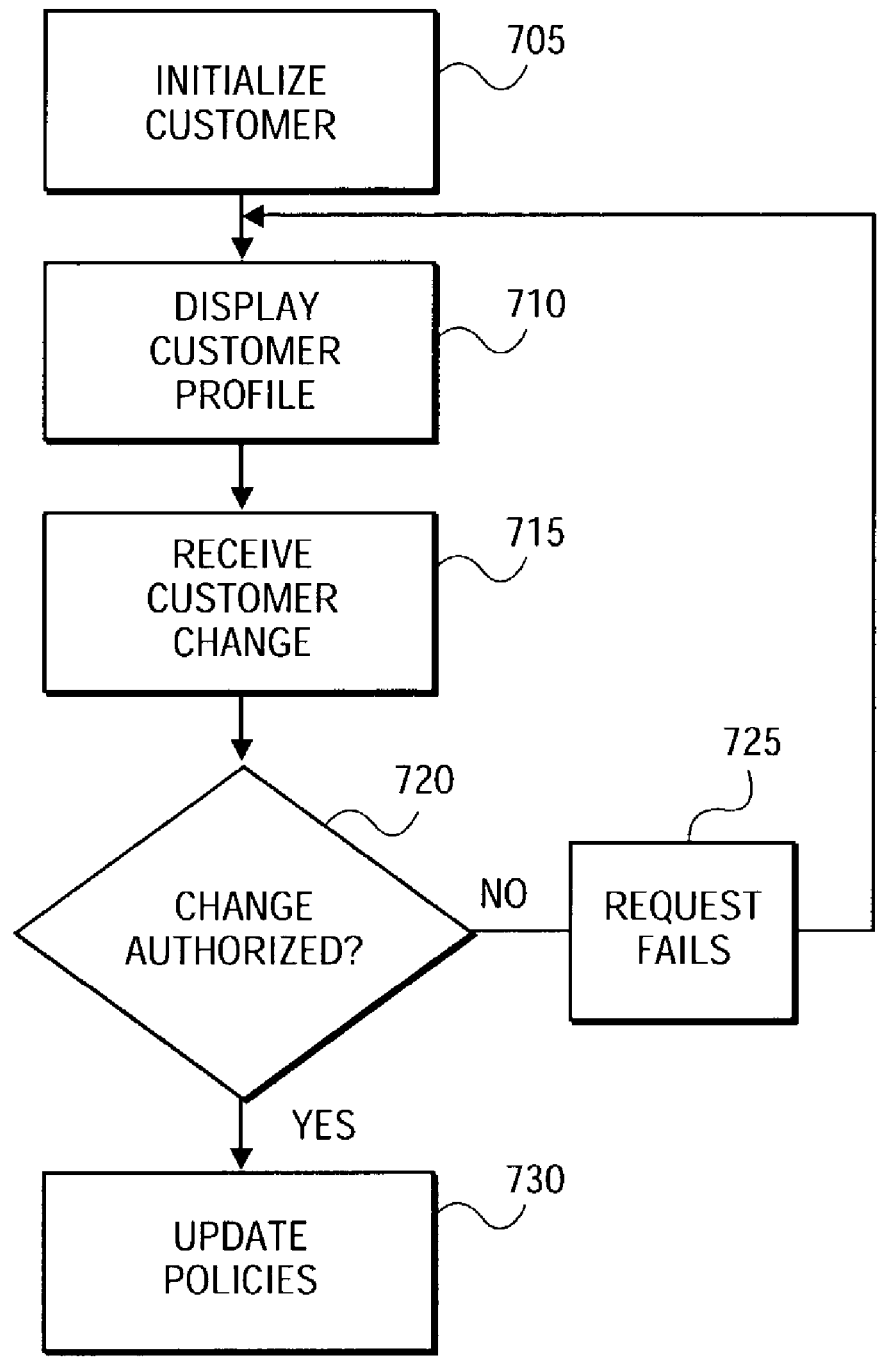
FIG. 7 is a flowchart illustrating a process of shared storage management in accordance with methods and systems consistent with the present invention.

At least one embodiment of the present invention provides policy based storage management—each customer can appear to have access to a non-shared storage subsystem. By providing a virtualization layer, a customer may be given the ability to manage its own storage needs. For example, FIG. 7 is a flowchart illustrating one embodiment of shared storage management by a customer in accordance with methods and systems consistent with the present invention.

In step 705, a customer is initialized by setting up an account with a shared storage provider. Initialization may involve, for example, customers providing to the data storage provider desired or required service expectancies and system policies. The customer may identify attributes such as system performance, system availability, and storage capacity desired for data transfer. These attributes may be outlined in a service level agreement (SLA) as explained above. The customer may define the attributes by, for example, providing the information to a sales person or other representative of the shared storage provider or by entering such information electronically via a user interface operating on a computer with network access.

In step 710, the customer may optionally be displayed its account information or SLA by, for example, a user interface that displays some or all attributes of the user account to the customer. Such information may be displayed visually by, for example, a web page or as a graphical user interface as part of a specialized application program. The customer may be displayed, for example, usage or performance data such as information about how much logical storage the customer is currently assigned, the price the customer is paying for such storage, and the current percentage of purchased storage space that is being utilized by the customer.

The customer may make a request to alter its account attributes or SLA by, for example, entering information into fields of a web page or GUI. For example, the customer may know that future demands may require more storage space and the customer may wish to purchase more storage. Alternatively, the customer may see from the usage data or otherwise determine that utilization is low and customer may opt to reduce the amount of storage space assigned to it. Alternatively, customer may have chosen a SLA that specifies that the amount of storage space assigned to any customer should automatically increase or decrease based on need, as determined automatically by the system. In this case, a request to increase or decrease storage space may be generated automatically by the system.

The request generated by the user (or alternatively by the system) is analyzed to determine, for example, if the request contains more than one element for execution. For example, one request to decrease storage capacity may require that more than one device must be notified. If the request contains more than one executable element, the request may be parsed into executable elements and may be ordered for execution.

In certain embodiments of the present invention, for each executable element, it is determined whether the customer is authorized to make the requested change by, for example, comparing the request to account attributes assigned to the customer or any other suitable authentication process (step 720). For example, it may be desirable in certain embodiments to limit the attributes that the customer may modify over the network. If a customer attempts to modify the "blocked" attributes, the request may fail (step 725).

Additionally, in certain embodiments, it may also be determined whether it is possible from a system perspective to make the requested change. For example, if a customer enters a request for more storage capacity than exists in the entire storage architecture or than is currently available, the request may be denied.

If the requested changes are authorized and possible to execute, other policies related to the customer and affected by the change may be updated accordingly or new policies may be generated (step 730). Policies related to the customer may be updated or generated based on a unique customer ID number. By the customer ID number, the physical location of the customer in the storage area network and other characteristics of the customer may be determined and other related policies or devices may be determined. For example, if one or more of the logical storage areas associated with a customer is deleted, the customer should not have future access to the deleted logical storage area. All profiles, tables, processes, devices and abstractions that associate the deleted logical storage area with any of the authorized customer ports must be modified and the changes distributed.

Figure 8:
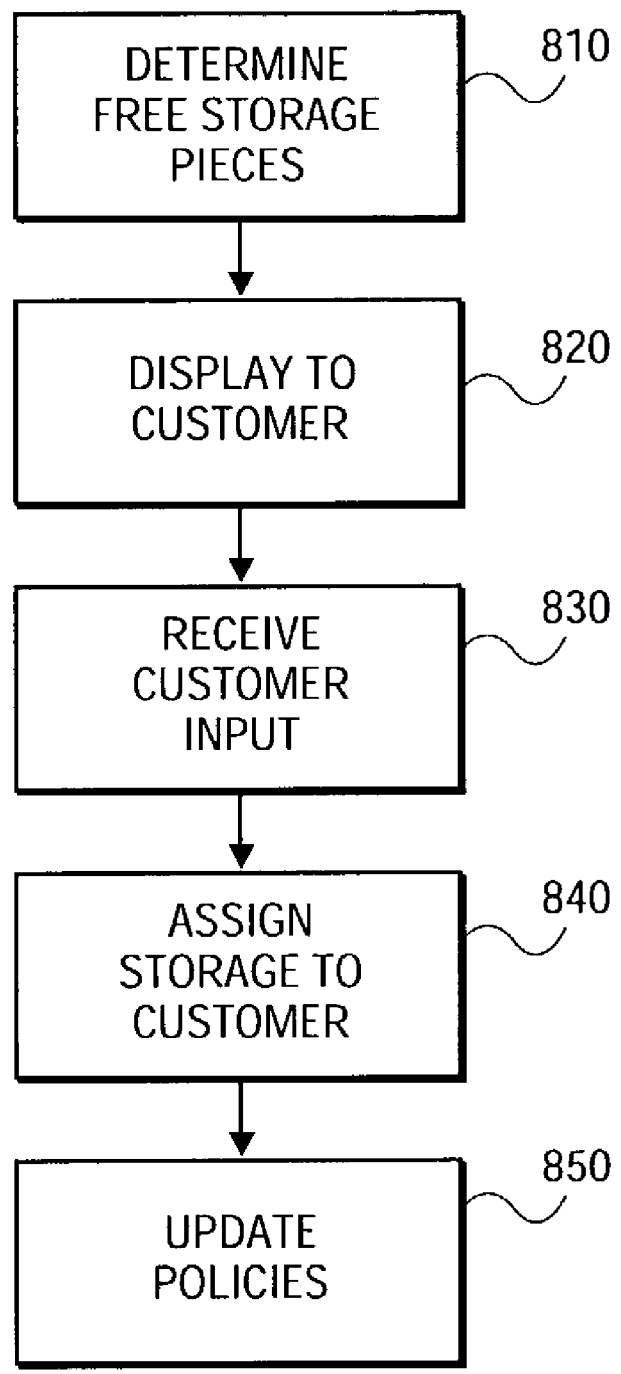
FIG. 8 is a flowchart illustrating a process of increasing the storage allocation of a customer in accordance with methods and systems consistent with the present invention.

FIG. 8 is a flowchart illustrating a process of increasing the storage allocation of a customer in accordance with methods and systems consistent with the present invention. Assume, for the sake of example, that the customer wishes to increase the storage area allocated to its needs. A customer may log on electronically to software running on a client computer at the customer's site or running on the storage provider's server and accessed via a network. In this certain embodiment, a request for a change may be received from the customer. In one implementation, a user interface may display via a display device one or more options or icons from which a customer may select. Upon receiving a request to increase storage, a software module determines the unallocated storage areas or LUNs in the storage architecture (step 810) and displays information relating to the storage areas to the customer (step 820). The software module may selectively omit certain storage areas that are unallocated but not suitable for the customer. The software module may determine if a storage area is suitable for a customer based on the customer's SLA or other policies related to the customer. The software module may also selectively display only certain storage areas based on other factors, such as performance and cost.

The customer may select one or more of the displayed storage areas and such selection is captured (step 830). Alternatively, the customer may enter a total amount of additional storage that the customer needs and one or more unallocated storage areas, that together total at or near what the customer needs, may be automatically chosen for the customer.

After storage areas are selected for the customer, the selected storage areas are assigned to the customer. Assignment may be done either manually or electronically via software. As shown in FIG. 1, for example, device configuration mechanism 179, under control of management server 180, may assign a selected LUN to each server of the customer. In certain embodiments, the customer may receive a notification that the new storage areas are available for use. The newly assigned storage areas may also be marked as unavailable to future customers by, for example, placing indications in storage or customer configuration tables It should be understood that a similar method may be used to decrease the amount of storage space assigned to a customer. In this certain embodiment, a customer may view a list of all storage areas assigned to the customer and may indicate which of the storage areas to disassociate from the customer. The customer selections are captured and the storage areas, or the LUNs associated with the selected storage areas, are disassociated with the customer by, for example, removing the table entries that link the customer number and servers of the customer with certain ports that allow access to the selected storage areas.

As mentioned above, in certain embodiments, changes to the customer policies may be made automatically or dynamically when a monitored event occurs or when certain parameters pass a threshold. Such changes may be invisible to the customer. For example, if a storage area assigned to a certain customer is filling up or the customer's allocated pool of tapes is empty, additional storage (such as an additional tape or LUN) may be assigned to the customer as described above. Conversely, storage may be removed automatically or dynamically as the customer's needs decrease.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for managing data stored in a storage architecture comprising a plurality of logical storage areas in at least one storage device, the storage architecture shared by a plurality of customers such that more than one customer is assigned logical storage areas on any single storage device, the method comprising:

associating with each customer, service expectancies and system policies, including expectancies and policies relating to one or more of system performance and system availability for each respective customer;

storing the service expectancies and system policies for a particular customer in a service profile established for the particular customer and separate from any other customer profile, wherein the service expectancies and system policies are based on a previously established contract between the particular customer and a service provider, wherein the service expectancies and system policies relate to both system performance and system availability, wherein the service expectancies and system policies relating to system performance define a level of performance from the storage architecture to be provided to the particular customer;

receiving from one of the plurality of customers a request for additional storage capacity within the storage architecture;

determining which of the plurality of logical storage areas are not assigned to any of the plurality of customers and which would satisfy the requesting customer's request for additional storage capacity and which would satisfy said service expectancies and system policies associated with the requesting customer;

displaying to the requesting customers an indication of available unassigned logical storage areas;

receiving input from the requesting customer selecting at least one of the available unassigned logical storage areas indicated by said displaying; and assigning the selected unassigned logical storage area to the requesting customer, including, associating a customer-specific input/output port of the requesting customer to the assigned logical storage area.

2. The method of claim 1, further comprising:
authenticating the one of the plurality of customers before assigning based on the customer input.

3. The method of claim 1, further comprising:
determining which of the plurality of unassigned logical storage areas to display to the customer.

4. The method of claim 3, wherein determining which of the plurality of unassigned logical storage areas to display to the customer comprises determining which of the plurality of unassigned logical storage areas to display to the customer based, at least in part, on one or more of price, volume, or performance.

5. The method as in claim 1 wherein each customer is a business enterprise having a plurality of customer devices configured to access data stored in the storage architecture.

6. A method for managing data stored in a storage architecture comprising a plurality of logical storage areas in at least one storage device, the storage architecture shared by a plurality of customers such that more than one customer is assigned storage on any single storage device, the method comprising:

associating service expectancies with each customer, said service expectancies including expectancies and policies relating to one or more of system performance and system availability;

storing the service expectancies and system policies for each customer in a service profile established for each customer and separate from any other customer profile, wherein the service expectancies and system policies are based on a previously established contract between an associated customer and a service provider, wherein the service expectancies and system policies relate to both system performance and system availability, wherein the service expectancies and system policies relating to system performance define a level of performance from the storage architecture to be provided to the associated customer;

determining based at least in part on activity of a particular customer and on the service expectancies associated with the particular customer, that the particular customer requires additional storage in order to satisfy the service expectancies associated with the particular customer, said activity being distinct from a request by a customer for additional storage within the storage architecture;

displaying to the particular customer an indication of available unassigned logical storage areas;

receiving input from the particular customer selecting at least one of the available unassigned logical storage areas indicated by said displaying; and assigning the selected unassigned logical storage area to the particular customer, including, associating a customer-specific input/output port of the particular customer to the assigned logical storage area.

7. The method of claim 6, further comprising:

associating system policies with each of the plurality of customers; and determining which of the unassigned logical storage areas to assign to the customer based at least in part on system policies related to the one of the plurality of customers, wherein the at least one of the logical storage areas assigned to the one of the plurality of customers is assigned if the system policies associated with the one of the plurality of customers are satisfied.

8. The method as in claim 6 wherein the step of determining that the customer requires additional storage is made automatically.

9. The method as in claim 6 wherein the step of determining that the customer requires additional storage is made based, at least in part, in response to a request from the customer.

10. The method as in claim 6 wherein each customer is a business enterprise having a plurality of customer devices configured to access data stored in the storage architecture.

11. A method for managing data stored in a storage architecture comprising a plurality of logical storage areas in at least one storage device, the storage architecture shared by a plurality of customers such that more than one customer is assigned storage on any single storage device, the method comprising:

associating service expectancies and system policies with each of the plurality of customers;

storing the service expectancies and system policies for a particular customer in a service profile established for the particular customer and separate from any other customer profile, wherein the service expectancies and system policies are based on a previously established contract between the particular customer and a service provider, wherein the service expectancies and system policies relate to both system performance and system availability, wherein the service expectancies and system policies relating to system performance define a level of performance from the storage architecture to be provided to the particular customer;

determining, based at least in part on activity of one of the plurality of customers and on the service expectancies and system policies associated with said one of the plurality of customers, that the customer's storage requirements have changed;

displaying to the customer an indication of available unassigned logical storage areas;

receiving input from the customer selecting at least one of the available unassigned logical storage areas indicated by said displaying; and assigning the selected unassigned logical storage area to the customer, including, associating a customer-specific input/output port of the customer to the assigned logical storage area.

12. The method as in claim 11 wherein determining that said customer requires more storage.

13. The method as in claim 11 wherein each customer is a business enterprise having a plurality of customer devices configured to access data stored in the storage architecture.

* * * * *